United States Patent
Nair et al.

(10) Patent No.: US 8,331,065 B2
(45) Date of Patent: Dec. 11, 2012

(54) METHOD AND APPARATUS FOR IMPROVING THE PERFORMANCE OF AN INVERTER

(75) Inventors: Sreejakumar Sreekantan Nair, Bangalore (IN); Ramakrishnan Madenoor Krishnan, Bangalore (IN)

(73) Assignee: American Power Conversion Corporation, West Kingston, RI (US)

( * ) Notice: Subject to any disclaimer, the term of this patent is extended or adjusted under 35 U.S.C. 154(b) by 388 days.

(21) Appl. No.: 12/717,213

(22) Filed: Mar. 4, 2010

(65) Prior Publication Data
US 2010/0226051 A1    Sep. 9, 2010

(30) Foreign Application Priority Data
Mar. 5, 2009  (IN) .............................. 407/KOL/2009

(51) Int. Cl.
*H02H 7/00* (2006.01)
*H02B 1/20* (2006.01)
(52) U.S. Cl. .......................................... 361/18; 361/652
(58) Field of Classification Search .................... 361/18; 340/652
See application file for complete search history.

(56) References Cited

U.S. PATENT DOCUMENTS

| | | |
|---|---|---|
| 6,710,580 B2 | 3/2004 | Shinba |
| 2003/0072117 A1 | 4/2003 | Maekawa et al. |
| 2006/0146464 A1 | 7/2006 | Tan et al. |
| 2007/0133241 A1* | 6/2007 | Mumtaz et al. ............... 363/131 |
| 2008/0211683 A1* | 9/2008 | Curt et al. ..................... 340/652 |

OTHER PUBLICATIONS

International Search Report and Written Opinion from corresponding International Application No. PCT/US2010/026197 dated Oct. 11, 2010.

* cited by examiner

*Primary Examiner* — Jared Fureman
*Assistant Examiner* — Scott Bauer
(74) *Attorney, Agent, or Firm* — Lando & Anastasi, LLP (57) ABSTRACT

Aspects of the invention are directed to methods and apparatus to protect an inverter from failure due to neutral lifting. In one aspect, the present invention provides a method of controlling an inverter in a UPS, the inverter being selectively coupled to a power line and comprising an input to receive an input voltage from the power line. The method comprises acts of monitoring the input voltage, detecting based on the act of monitoring, that the input voltage exceeds a predetermined high threshold value, isolating the inverter from the power line responsive to detecting that the input voltage exceeds a predetermined high threshold value, determining whether or not a neutral lifting condition exists on the power line, indicating that the inverter is in a fault state if the neutral lifting condition exists, and reconnecting the inverter to the power line if the neutral lifting condition does not exist.

26 Claims, 9 Drawing Sheets

METHOD AND APPARATUS FOR IMPROVING THE PERFORMANCE OF AN INVERTER

RELATED APPLICATION

This application claims priority under 35 U.S.C. §119 to Indian Application No. 407/KOL/2009, entitled "METHOD AND APPARATUS FOR IMPROVING THE PERFORMANCE OF AN INVERTER," by Ramakrishan Madenoor Krishnan et al., filed on Mar. 5, 2009, which is hereby incorporated herein by reference in its entirety.

BACKGROUND OF THE INVENTION

1. Field of Invention

The present invention relates generally to inverters. More particularly, at least one embodiment of the invention relates to methods and apparatus for improving the performance of an inverter and for providing protection for components of the inverter.

2. Discussion of Related Art

Inverters are used in a variety of different power systems. For example, inverters are commonly used in uninterruptible power supplies (UPSs) to provide regulated, uninterrupted power for sensitive and/or critical loads, such as computer systems and other data processing systems. In at least one type of a UPS, an inverter has a battery state of operation and a charger state of operation. The battery state of operation is entered when the alternating current (AC) power provided to a load by a main AC input is not able to support the load. In the battery state of operation, the inverter converts direct current (DC) power from a battery into AC power, and provides the AC power to the load. When the main AC input is able to support the load, the inverter enters the charger state of operation. In the charger state of operation, the inverter converts AC power from the main AC input into DC power and supplies the DC power to the backup battery to charge the battery.

Figure 1A:
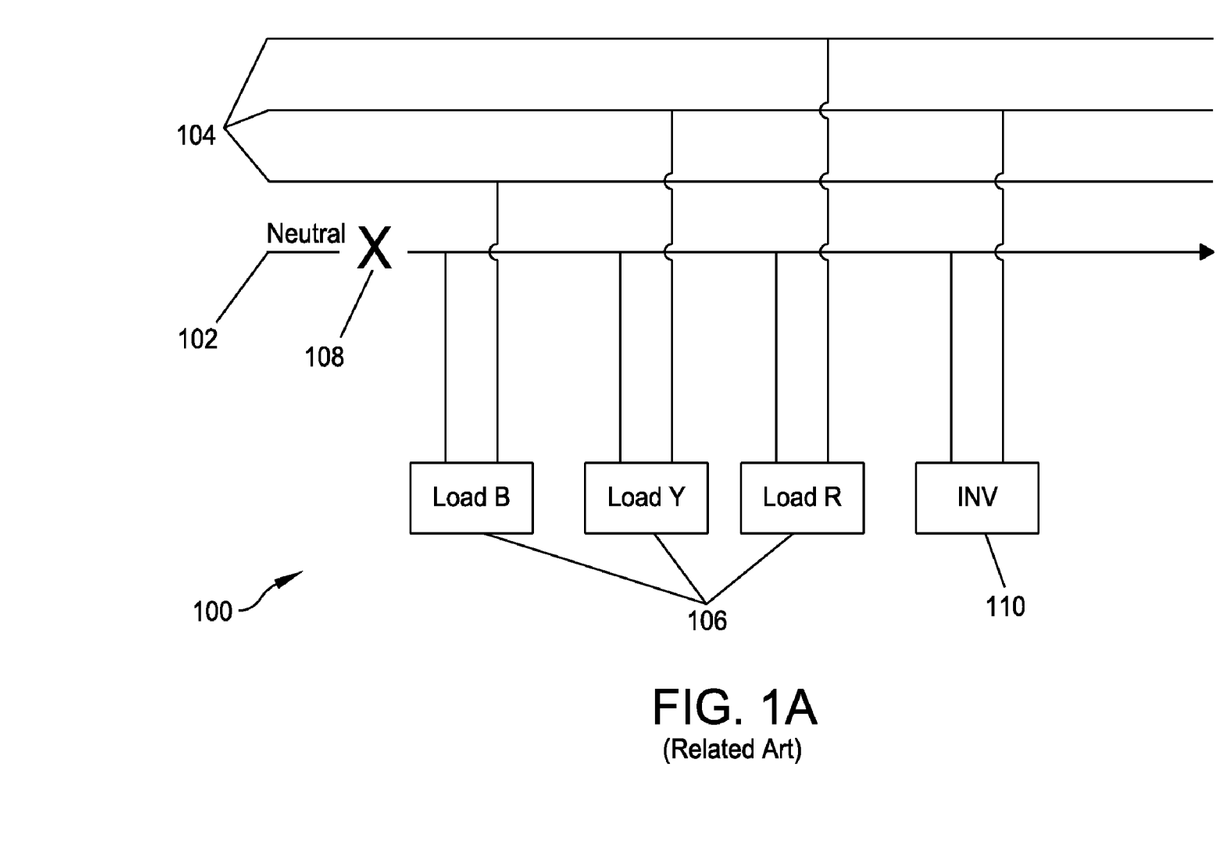
FIG. 1A is a schematic diagram of one example of a conventional three phase power supply system.

In certain power systems in which single-phase inverters are used, a load may be connected to multiple different phase lines and to a neutral line. An example of such a system is illustrated in FIG. 1. In the illustrated example, the power system 100 includes a three-phase supply system having a common neutral line 102, three power lines/phases 104, a plurality of loads 106 coupled to the three phases 104 and to the neutral line 102, and an inverter 110 coupled to one of the three phases 104 and to the neutral line 102. In some circumstances it is possible that the neutral line 102 or one of the phases 104 may fail, for example, due to a blown fuse or other condition. For example, point 108 illustrates a fail or open condition on the neutral line 102. A failure in the neutral line 102 (or one of the phases 104) can cause an imbalance in the loading of the power system 100, a condition referred to as dynamic loading, which causes unpredictable voltages to be provided to the inverter 110 and the plurality of loads 106 connected to the power lines. In particular, the input voltage to the inverter 110 may sag or swell unpredictably, causing the inverter to fail.

SUMMARY OF INVENTION

An unstable, arcing or disconnected neutral line in a power system such as that illustrated in FIG. 1, a condition referred to a "neutral lifting," can cause uncontrolled and unpredictable sag and swell in the input line voltage, resulting in failure of the inverter. Accordingly, aspects and embodiments are directed to methods and apparatus to protect an inverter from permanent failure due to the problems associated with neutral lifting by isolating the inverter from the power line when a high line is detected to prevent high current damage, and by suspending state changes of the inverter when neutral lifting is suspected to prevent state hovering, as discussed in more detail below.

In one aspect, the present invention features a method of controlling an inverter in an uninterruptable power supply system, the inverter being selectively coupled to a power line and comprising an input to receive an input voltage from the power line. The method may comprise acts of monitoring the input voltage, detecting based on the act of monitoring, that the input voltage exceeds a predetermined high threshold value, isolating the inverter from the power line responsive to detecting that the input voltage exceeds a predetermined high threshold value, determining whether or not a neutral lifting condition exists on the power line, indicating that the inverter is in a fault state if the neutral lifting condition exists, and reconnecting the inverter to the power line if the neutral lifting condition does not exist.

According to one embodiment, the act of determining whether the neutral lifting condition exists includes determining, based on the act of monitoring the voltage, that the neutral lifting condition is suspected on the power line, and suspending state changes in the inverter responsive to the neutral lifting condition being suspected. In one example, the act of determining that the neutral lifting condition is suspected includes determining that the input voltage meets a first predetermined condition within a first time period after the input voltage exceeds the predetermined high threshold value, and indicating that the inverter is in a neutral lifting suspected state responsive to the input voltage meeting the first predetermined condition within the first time period. Determining that the input voltage meets the first predetermined condition may include detecting that the input voltage has, within the first time period, transitioned from a value greater than the high voltage threshold value to a value less than the high voltage threshold value and has returned to a value greater than the high voltage threshold value.

In another embodiment, the method may further comprise starting a first timer responsive to detecting that the input voltage exceeds the predetermined high threshold value, to define the first predetermined time period. Starting the first timer may include starting a retriggerable timer. In one example, the method further comprises resetting the retriggerable timer responsive to at least one of: the input voltage having transitioned from a value greater than the high voltage threshold value to a value less than the high voltage threshold value, the input voltage having transitioned from a value less than the high voltage threshold value to a value greater than the high voltage threshold value, the input voltage having transitioned from a value greater than a low voltage threshold value to a value less than the low voltage threshold value, and the input voltage having transitioned from a value less than the low voltage threshold value to a value greater than the low voltage threshold value. In another example, starting the first timer may include starting a 20 second timer to define the first time period to be 20 seconds from when the input voltage exceeds the predetermined high threshold value.

According to another example, indicating that the inverter is in a neutral lifting suspected state may include setting a neutral lifting suspected flag. Determining whether the neutral lifting condition exists may further include determining that the inverter meets a second predetermined condition within a second time period after the act of indicating that the neutral lifting condition is suspected, and indicating that the neutral lifting condition is confirmed responsive to the inverter meeting the second predetermined condition within the second time period. In another example, indicating that the neutral lifting condition is confirmed includes setting a neutral lifting fault flag. Determining that the inverter meets the second predetermined condition may include detecting that the inverter has remained in the neutral lifting suspected state for the duration of the second time period. According to another example, the method may further comprise starting a second time timer responsive to indicating that the inverter is in a neutral lifting suspected state, to define the second time period. Starting the second timer may include starting a 30 second non-retriggerable timer to define the second time period as 30 seconds from when the neutral lifting condition is suspected.

In another aspect, the present invention features a method of controlling an inverter in an uninterruptable power supply system, the inverter being selectively coupled to a power line and comprising an input to receive an input voltage from the power line. The method may comprise acts of monitoring the input voltage, detecting, based on the act of monitoring, that the input voltage exceeds a predetermined high threshold value, isolating the inverter from the power line responsive to detecting that the input voltage exceeds a predetermined high threshold value, indicating that a neutral lifting condition is suspected on the power line responsive to the input voltage meeting a first predetermined condition within a first time period after the input voltage exceeds the predetermined high threshold value, suspending state changes in the inverter responsive to the neutral lifting condition being suspected, indicating that the neutral lifting condition is confirmed responsive to the input voltage meeting a second predetermined condition within a second time period after the neutral lifting condition is suspected, and setting the inverter to a fault state responsive to the neutral lifting condition being confirmed.

According to another aspect, the present invention features an uninterruptible power supply. The uninterruptible power supply may comprise an input to receive an input voltage, a power line coupled to the input to receive the input voltage, an inverter configured to be selectively coupled to the power line and having an inverter input to receive the input voltage from the power line, a sensor coupled to the inverter input and configured to monitor the input voltage and to generate an indicator representative of a magnitude of the input voltage, a controller coupled to the sensor and configured to receive the indicator. The controller may be configured to determine, based on receiving the indicator, that the input voltage exceeds a predetermined high threshold value, to isolate the inverter from the power line responsive to the input voltage exceeding the predetermined high threshold value, to determine whether or not a neutral lifting condition exists on the power line, to indicate that the inverter is in a fault state if the neutral lifting condition exists, and to reconnect the inverter to the power line if the neutral lifting condition does not exist.

According to one embodiment, in determining whether or not a neutral lifting condition exists on the power line, the controller is further configured to determine, based on receiving the indicator, that the neutral lifting condition is suspected on the power line, and suspend state changes in the inverter responsive to the neutral lifting condition being suspected. According to one example, in determining that the neutral lifting condition is suspected, the controller is further configured to determine that the input voltage meets a first predetermined condition within a first time period after the input voltage exceeds the predetermined high threshold value, and indicate that the inverter is in a neutral lifting suspected state responsive to the input voltage meeting the first predetermined condition within the first time period. In determining that the input voltage meets the first predetermined condition, the controller may be further configured to determine that the input voltage has, within the first time period, transitioned from a value greater than the high voltage threshold value to a value less than the high voltage threshold value and has returned to a value greater than the high voltage threshold value.

The controller may be further configured to start a first timer responsive to detecting that the input voltage exceeds the predetermined high threshold value, to define the first predetermined time period. In one example, the first timer is a retriggerable timer. The controller may be further configured to reset the retriggerable timer responsive to at least one of: the input voltage having transitioned from a value greater than the high voltage threshold value to a value less than the high voltage threshold value, the input voltage having transitioned from a value less than the high voltage threshold value to a value greater than the high voltage threshold value, the input voltage having transitioned from a value greater than a low voltage threshold value to a value less than the low voltage threshold value, and the input voltage having transitioned from a value less than the low voltage threshold value to a value greater than the low voltage threshold value. In one example, the first timer is a 20 second timer that defines the first time period to be 20 seconds from when the input voltage exceeds the predetermined high threshold value.

According to one or more aspects of the invention, the controller may be further configured to set a neutral lifting suspected flag to indicate that neutral lifting is suspected. In determining whether the neutral lifting condition exists, the controller may be further configured to determine that the inverter meets a second predetermined condition within a second time period after the neutral lifting condition is suspected, and indicate that the neutral lifting condition is confirmed responsive to the inverter meeting the second predetermined condition within the second time period. In one example, the controller is further configured to set a neutral lifting fault flag to indicate that the neutral lifting condition is confirmed.

According to another example, the controller is further configured to start a second time timer responsive to indicating that the inverter is in a neutral lifting suspected state, to define the second time period. In one example, the second timer is a thirty second non-retriggerable timer that defines the duration of the second time period to be thirty seconds.

In another aspect, the present invention features an uninterruptible power supply system. The power supply system may comprise an input to receive an input voltage, a power line coupled to the input to receive the input voltage, an inverter configured to be selectively coupled to the power line and having an inverter input to receive the input voltage from the power line, a sensor coupled to the inverter input and configured to monitor the input voltage and to generate an indicator representative of a magnitude of the input voltage, and means for determining that the power line is experiencing a neutral lifting condition.

According to one example, the means for determining that the power line is experiencing a neutral lifting condition may include means for determining that the neutral lifting condition is suspected on the power line. According to another example, the means for determining that the power line is experiencing a neutral lifting condition may further include means for confirming that the neutral lifting condition exists on the power line.

Still other aspects, embodiments, and advantages of these exemplary aspects and embodiments, are discussed in detail below. Any embodiment disclosed herein may be combined with any other embodiment in any manner consistent with the objects, aims, and needs disclosed herein, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. The appearances of such terms herein are not necessarily all referring to the same embodiment. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF DRAWINGS

Various aspects of at least one embodiment are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every drawing. The figures are provided for the purposes of illustration and explanation and are not intended as a definition of the limits of the invention. In the figures:

DETAILED DESCRIPTION

Figure 1B:
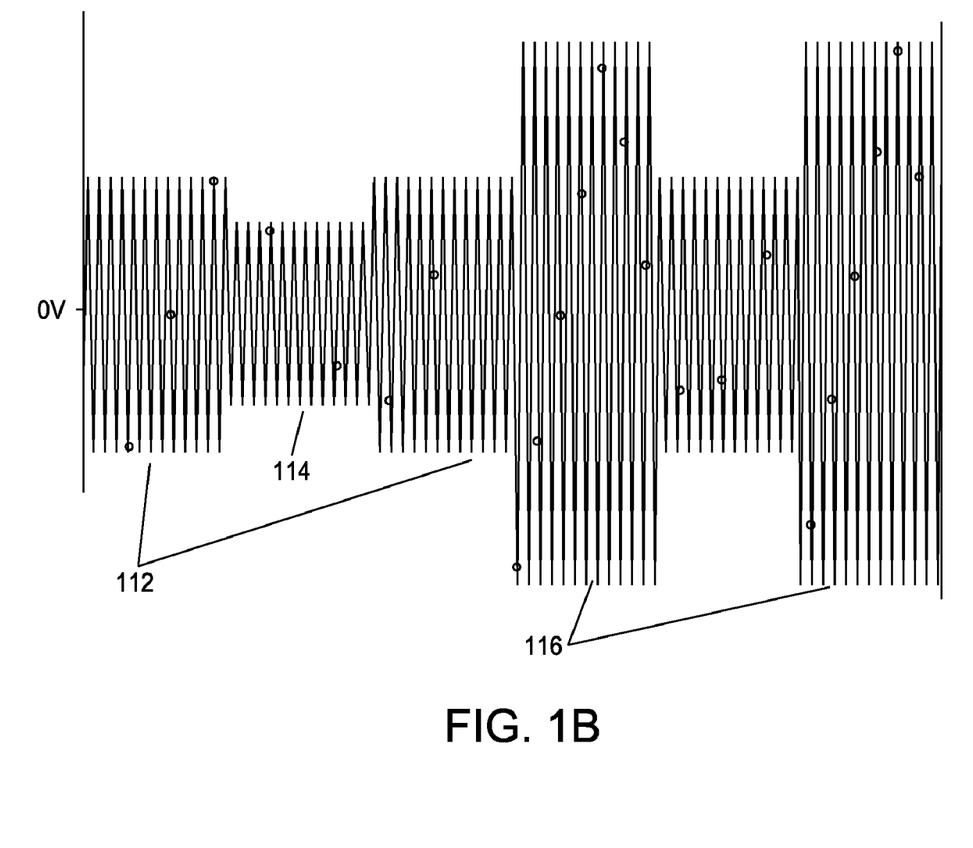
FIG. 1B is an illustration of variable input voltage levels due to neutral lifting.

Aspects and embodiments are directed to methods and apparatus for protecting an inverter in a power system from permanent failure due to uncontrolled and furious sag and swell of the input line voltage due to neutral lifting and/or dynamic loading conditions. As discussed above, an unstable, arcing or disconnected neutral line can cause uncontrolled, unpredictable sag and swell of the input line voltage. For example, the voltage may swing from zero (or close to zero) to as high as the line-to-line voltage. Referring to FIG. 1B, there is illustrated an example of varying input line voltage to an inverter due to neutral lifting. The voltage can sag below the "line good" voltage level 112 to a "low line" level 114 or swell to a "high line" level 116 which is less than or equal to the line-to-line voltage of the system.

Figure 2:
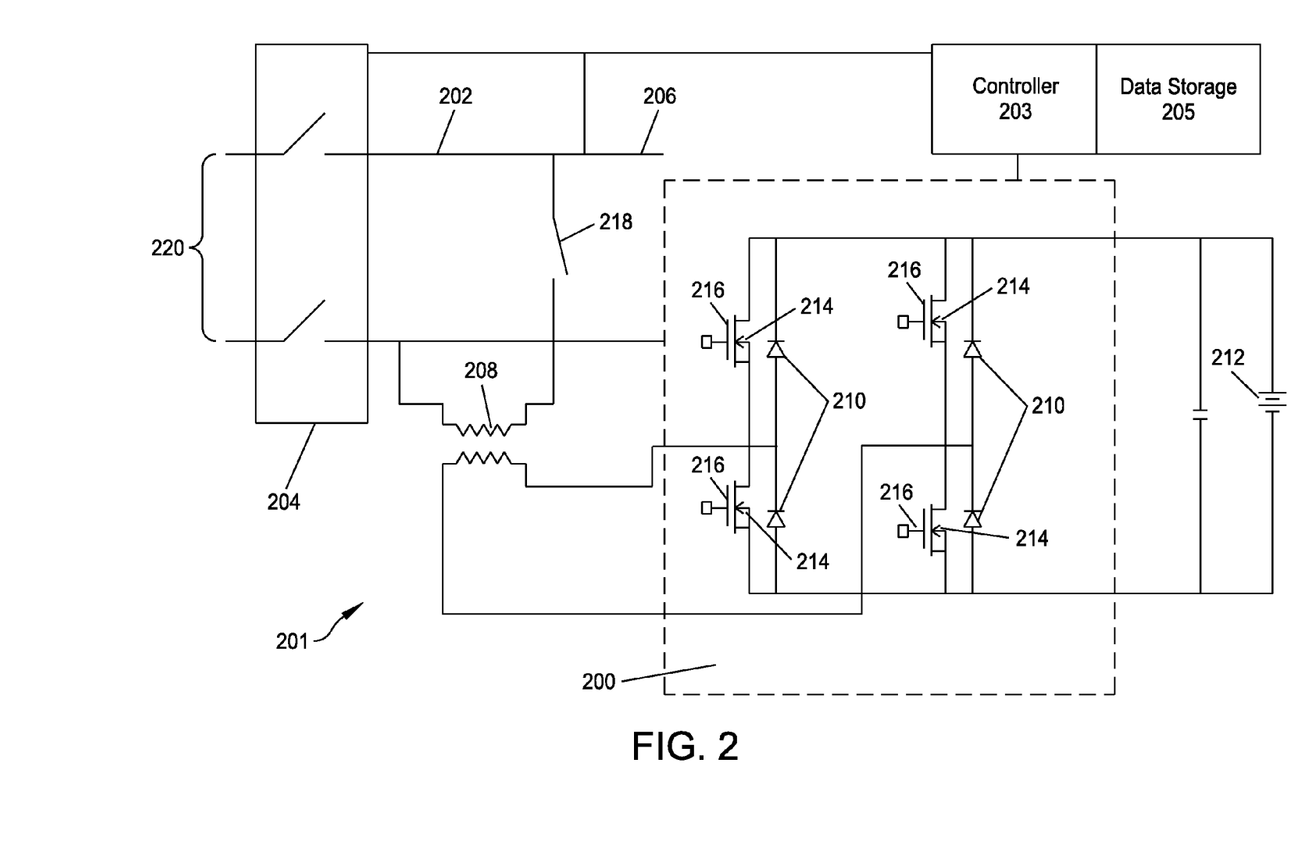
FIG. 2 is a diagram of one example of a UPS system including an inverter.

Referring to FIG. 2, there is illustrated an example of an uninterruptible power supply (UPS) 201 having an inverter 200 coupled to a power line 202 of a three-phase power system. The UPS 201 includes an AC input line coupled to the power line 202 which receives an input voltage 220 (and current) via a transfer relay 204. The UPS 201 further includes a transformer 208, a battery 212 and an inverter relay 218. The inverter 200 includes a plurality of diodes 210 providing a rectifier, and a plurality of Field Effect Transistors (FETs) 216. As discussed above, the inverter 200 switches between the battery state and the charger state of operation based on whether the AC input power can support the connected load. When the transfer relay 204 is closed, the input voltage 220 is coupled through the power line 202 to supply an output voltage 206 to a load (not shown). The input voltage 220 is also provided via the transformer 208 to the inverter 200 when the inverter 200 is in the charger state of operation, charging the battery 212. When the input voltage 220 goes high (i.e. is greater than a defined high voltage threshold level), the transfer relay 204 opens and the inverter 200 transitions from the charger state to the battery state.

The UPS 201 may also include a controller 203. Using data stored in associated memory, the controller performs one or more instructions that may result in manipulated data, and the controller monitors and controls operation of the UPS 201. In some examples, the controller may include one or more processors or other types of controllers. In one example, the controller is a commercially available, general purpose processor. In another example, the controller performs a portion of the functions disclosed herein on a general purpose processor and performs another portion using an application-specific integrated circuit (ASIC) tailored to perform particular operations. As illustrated by these examples, examples in accordance with the present invention may perform the operations described herein using many specific combinations of hardware and software and the invention is not limited to any particular combination of hardware and software components.

The UPS 201 may also include data storage 205. The data storage stores computer readable and writable information required for the operation of the UPS 201. This information may include, among other data, data subject to manipulation by the controller and instructions that are executable by the controller to manipulate data. The data storage may be a relatively high performance, volatile, random access memory such as a dynamic random access memory (DRAM) or static memory (SRAM) or may be a nonvolatile storage medium such as magnetic disk or flash memory. In one example, the data storage includes both volatile and non-volatile storage.

Generally in UPS systems, the transition of the inverter 200 from the charger state to the battery state takes multiple power cycles, for example, two or more power cycles. During this time, a current flows through a plurality of forward-biased body diodes 214 of the plurality FETs 216. This current is limited only by the leakage inductance/resistance of the winding of the transformer 208, the dynamic resistance of the forward biased diodes 210 and the internal resistance of the battery 212. In the case of a varying input line voltage due to neutral lifting, this current is potentially large and may be destructive to the inverter 200. Furthermore, as shown in FIG. 1B, due to the fact that the input voltage is varying in magnitude, after the inverter 200 has transitioned to a battery state, the input voltage may decrease through the "line good" level 112, causing the inverter to transition back to the charger state. After the inverter 200 has transitioned to the charger state, the input voltage may again increase to a "high line" level 116 causing the inverter to transition back to the battery state, driving a high, potentially damaging current through the inverter 200 as discussed above. This causes an undesirable condition referred to as "state hovering" in which the inverter fluctuates spuriously between the charger state and the battery state.

One solution to the problems caused by neutral lifting is to "overrate" the transformer 208 by increasing the number of turns so that the transformer can withstand the high line voltages that can be experienced during the neutral lifting condition. Overrating the transformer 208, however, adds cost and complexity to the solution. In 220 volt (V) systems, as are common in Europe and parts of Africa and Asia, the line-to-line voltage can be as high as 440V. Therefore, this solution suffers the disadvantage that the transformer must be significantly overrated, adding significant cost, to cope with high voltages experienced only for short durations. Another solution is to include a fuse or current stopper on the power line 202. This solution, however, is slow and there is significant potential that the FETs 216 will be damaged before the fuse has time to trigger. In addition, this solution adds cost due to the additional components used, and requires a hardware repair (to the blown fuse) to reinitialize the system. Another solution is to add additional relays to the power line 202 to isolate the inverter 200 in the event of high peak currents; however, this solution also requires additional hardware components and adds cost. In addition, these solutions do not prevent the problem of state hovering.

Accordingly, aspects and embodiments are directed to a method and apparatus to implement an algorithm for protecting the inverter 200 during neutral lifting/dynamic loading conditions. As discussed further below, in one embodiment, the method involves suspending state transitions (to avoid state hovering) when neutral lifting is suspected and, when neutral lifting is confirmed, signaling a fault condition and isolating the inverter to prevent damage. At least some embodiments may require little or no hardware modifications to the inverter and may not interfere with existing protections or normal operation of the inverter. Furthermore, at least some embodiments may add little or no extra cost to existing systems and may provide protection to the inverter under all conditions of neutral lifting. As discussed further below, in one embodiment, stresses to the inverter may be reduced at the first occurrence of a high input line and continuous stress to the inverter due to spurious state changes may be prevented.

It is to be appreciated that embodiments of the methods and apparatus discussed herein are not limited to the details of construction and the arrangement of components set forth in the following description or illustrated in the drawings. The methods and apparatus are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments. Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

As discussed above, one problem associated with neutral lifting is that very large currents can flow through the inverter 200, potentially damaging or destroying it, and another problem is state hovering which stresses the inverter and can also damage it or render it inoperable. Accordingly, one embodiment proposes to reduce the high current and state hovering problems related to neutral lifting by isolating the inverter from the input line when a high input is detected to prevent high current damage, and by suspending state changes when neutral lifting is suspected to prevent state hovering.

Figure 3:
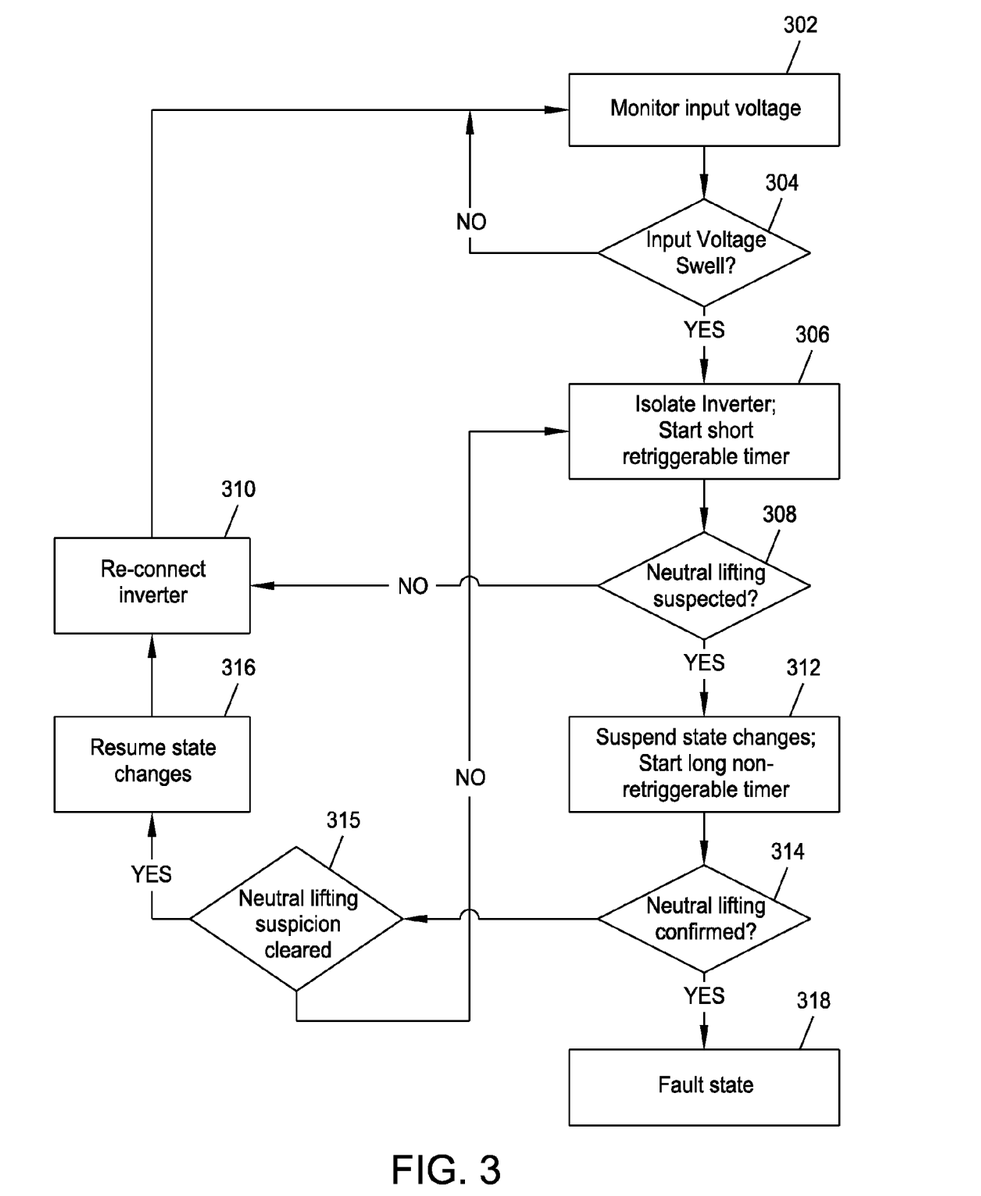
FIG. 3 is a flow chart illustrating one example of a method of operation of the inverter of FIG. 2, according to one aspects of the invention.

Referring to FIG. 3, there is illustrated a flow chart of one example of a method of controlling the inverter 200 according to one embodiment. The method includes monitoring an average voltage on the power line 202, as indicated by step 302. The average voltage may be a root mean square (RMS) voltage, or may be another measure of average voltage. In one example, the average of the voltage on the power line 202 is calculated from multiple samples of the voltage on the power line 202. In one example, the average of the voltage on the power line 202 is calculated using eight different samples of the voltage on the power line 202. However, it is to be appreciated that any number of samples may be used, not limited to eight samples. The input voltage 220 may be already monitored in existing inverter systems to determine when a genuine state change is required. Therefore, monitoring the input voltage in step 302 may not require any additional hardware (such as an additional sensor or transducer).

In one embodiment, monitoring the input voltage (step 302) includes monitoring the input voltage to determine whether the average voltage on the power line 202 is low (sag), good, or high (swell). A low voltage is an average voltage of magnitude less than a defined low voltage threshold. A "good" voltage is an average voltage magnitude within a defined "good" range, for example, greater than the defined low voltage threshold and less than a defined high voltage threshold. A high voltage is an average voltage greater than the defined high voltage threshold. When a high input voltage or voltage swell is detected (step 304), action may be taken to protect the inverter, as discussed further below.

According to one embodiment, at step 306, in response to a determination that the average voltage on the power line 202 is high, the inverter 200 is isolated from the power line 202 to prevent a high current from damaging the inverter 200. In one example, the inverter 200 is isolated from the power line 202 within one quarter cycle from when a high average voltage on the power line 202 is detected. In one example, if the inverter 200 is in the charger state, the inverter 200 is isolated from the power line 202 by opening the inverter relay 218. If the inverter 200 is in the battery state, the inverter may be isolated by opening the transfer relay 204. In this manner, the inverter 200 may be protected as soon as a high input voltage is detected. It will be appreciated by those skilled in the art that it is also possible to monitor the current on line 202, rather than the voltage, and to take the above-discussed actions based on the magnitude of the monitored current.

Figure 7:
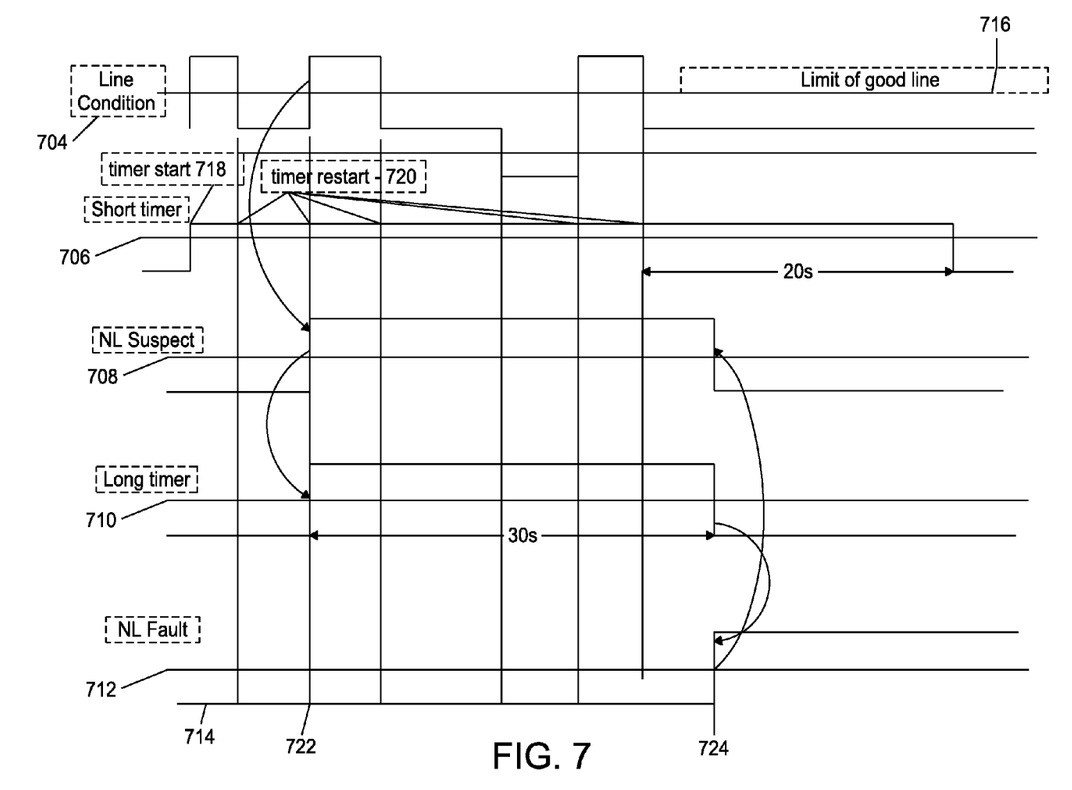
FIG. 7 is a timing diagram for one example of a method of operation of the inverter of FIG. 2, according to aspects of the invention.

According to one embodiment, also at step 306, in response to a determination that the average voltage on the power line 202 is high; a short re-triggerable timer is started. This short re-triggerable timer may be used to determine whether or not neutral lifting is suspected, as discussed further below, and whether or not the inverter 200 should be reconnected to the power line 202. Thus, in one embodiment, the short re-triggerable timer may be re-triggered every time the average voltage on the power line 202 transitions from a good level to a high or low level, from a high or low level to a good level, and from a high level to a low level, as illustrated in FIG. 7. FIG. 7 is a timing diagram illustrating one example of a method of controlling the inverter and inverter protection apparatus. Various aspects will be discussed below with continuing reference to FIG. 7.

As shown in FIG. 7, trace 704 is the input line voltage, shown fluctuating between low, good, and high values, with trace 716 indicating the good value. Trace 706 illustrates triggering of the short re-triggerable timer, the timer being started at 718 (corresponding to step 306 in FIG. 3) and being re-triggered at time periods 720 by transitions of the input voltage 704, as discussed above. The value of the short re-triggerable timer may be selected based on a variety of design conditions, such as for example, but not limited to, the length of the power cycles, information regarding the rate at which the input voltage varies or is likely to vary, etc. In one example, the short re-triggerable timer is a twenty second re-triggerable timer; however, it to be appreciated that other timer values may be selected.

Referring again to FIG. 3, step 308 includes determining whether neutral lifting is suspected. In one embodiment, neutral lifting is suspected when, after a first determination that the average voltage on the power line 202 is high, but before the short re-triggerable timer has timed out, a second determination is made that the average voltage on the power line 202 is high, after the average voltage on the power line 202 previously decreased to a good or low voltage. Neutral lifting may also be suspected when a first defined number of samples of the voltage and/or current on power line 202 are greater than a defined sample threshold level. For example, in one embodiment, neutral lifting is suspected in response to more than four individual voltage samples in one line cycle being found greater than a sample voltage threshold level. In another example, neutral lifting is suspected when a first defined number of individual current samples of the power line 202 are greater than a sample current threshold level. For example, in one embodiment, neutral lifting is suspected in response to more than two individual current samples in one line cycle being found to be greater than a defined sample current threshold level. When neutral lifting is suspected, a Neutral Lifting (NL) Suspected flag (NL Suspect) is set and state changes may be suspended in the inverter (step 312), as discussed further below.

If the conditions that would cause neutral lifting to be suspected do not occur within the defined time period, the inverter may be reconnected to the power line 202 (step 310) and the system may return to monitoring the input voltage (step 302) for a first high voltage occurrence. In one embodiment, the inverter 200 is reconnected to the power line 202 (step 310) responsive to a waiting period having elapsed since the inverter 200 was disconnected from the power line 202, a determination that neutral lifting is not suspected, and the voltage on the power line 202 being at a good level. In one example, the waiting period is two seconds.

According to one embodiment, if neutral lifting is suspected, the inverter state changes are suspended (step 312) to avoid state hovering, as discussed above. Also at step 312, a long non re-triggerable timer may be started to facilitate determining whether neutral lifting can be confirmed, as discussed further below. This is illustrated in FIG. 7. As shown in FIG. 7, at point 722, when the NL Suspect flag (represented by trace 708) is set, the long non-retriggerable timer (represented by trace 710) may also be triggered. The value of the long non-retriggerable timer may be selected based on a variety of design conditions, as will be appreciated by those skilled in the art. In one example, the non re-triggerable timer is a thirty second non re-triggerable timer; however, those skilled in the art will appreciate that other values/lengths for the timer may be selected. In addition, both the short retriggerable timer and the long non-retriggerable timer may be defined in software and may be determined or altered based on dynamic loading conditions.

Still referring to FIG. 3, step 314 includes determining whether neutral lifting is confirmed. If neutral lifting is not confirmed, then at step 315, the NL suspect flag may be cleared. The NL suspect flag is cleared and state changes are resumed (step 316) responsive to a determination that the voltage on the power line 202 is stable at any one of the low, good or high levels for a time set by the short re-triggerable timer, the waiting period has elapsed since neutral lifting was suspected for the first time, and over one line cycle there are no samples (of voltage or current) taken of the power line 202 that are greater than the respective defined sample threshold levels. If neutral lifting is confirmed (step 314), then the system may enter a fault state (step 318). According to one embodiment, when neutral lifting is confirmed, a Neutral Lifting Fault state flag (NL Fault) is set and state changes continue to be suspended absent outside interference, as discussed further below. In one example, the neutral lifting fault state is entered into responsive to the expiration/time out of the long non-retriggerable timer. This is illustrated in FIG. 7, where the neutral lifting fault flag (NL Fault, represented by trace 712) is shown set at time period 724 when the long non-retriggerable timer (trace 710) times out and the neutral lifting suspected (NL Suspect) flag is reset. A neutral lifting fault state may also entered into when a second defined number of individual (current or voltage) samples taken of the power line 202 are greater than a defined (voltage or current) sample threshold level. In one example, this defined number of samples is more than eight individual voltage samples in one line cycle or more than four individual current samples. In one embodiment, after the neutral lifting fault state 318 is entered, the suspension of states in the inverter and the isolation of the inverter will continue until there is interference from a user. For example, in one embodiment, the neutral lifting fault state will only be exited when a push button or other manual interface device is actuated (e.g., pressed) by a user.

Figure 4A:
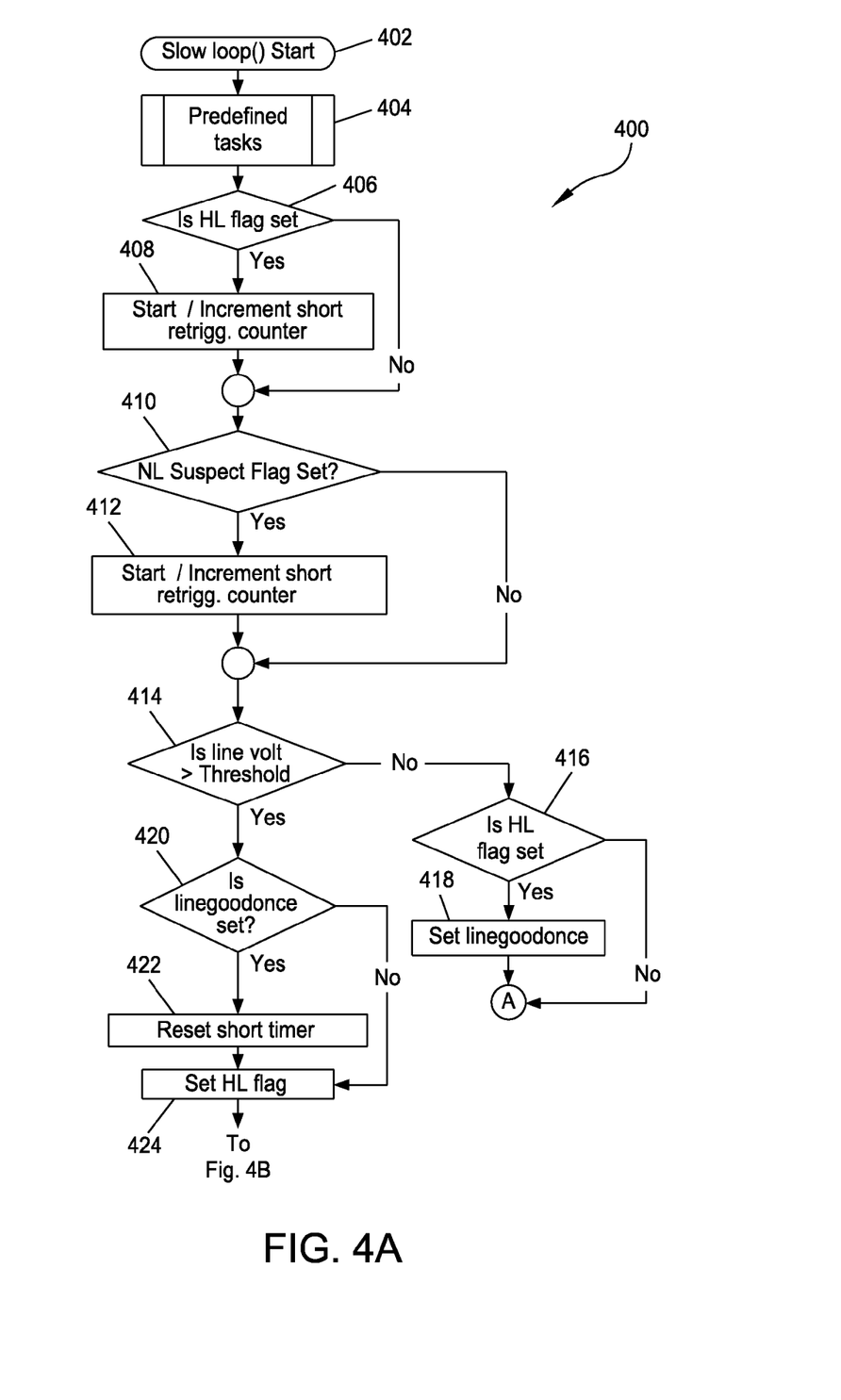
FIGS. 4A and 4B are flow charts illustrating one example of an algorithm for a slow loop method of operation of the inverter of FIG. 2, according to one aspects of the invention.
Figure 4B:
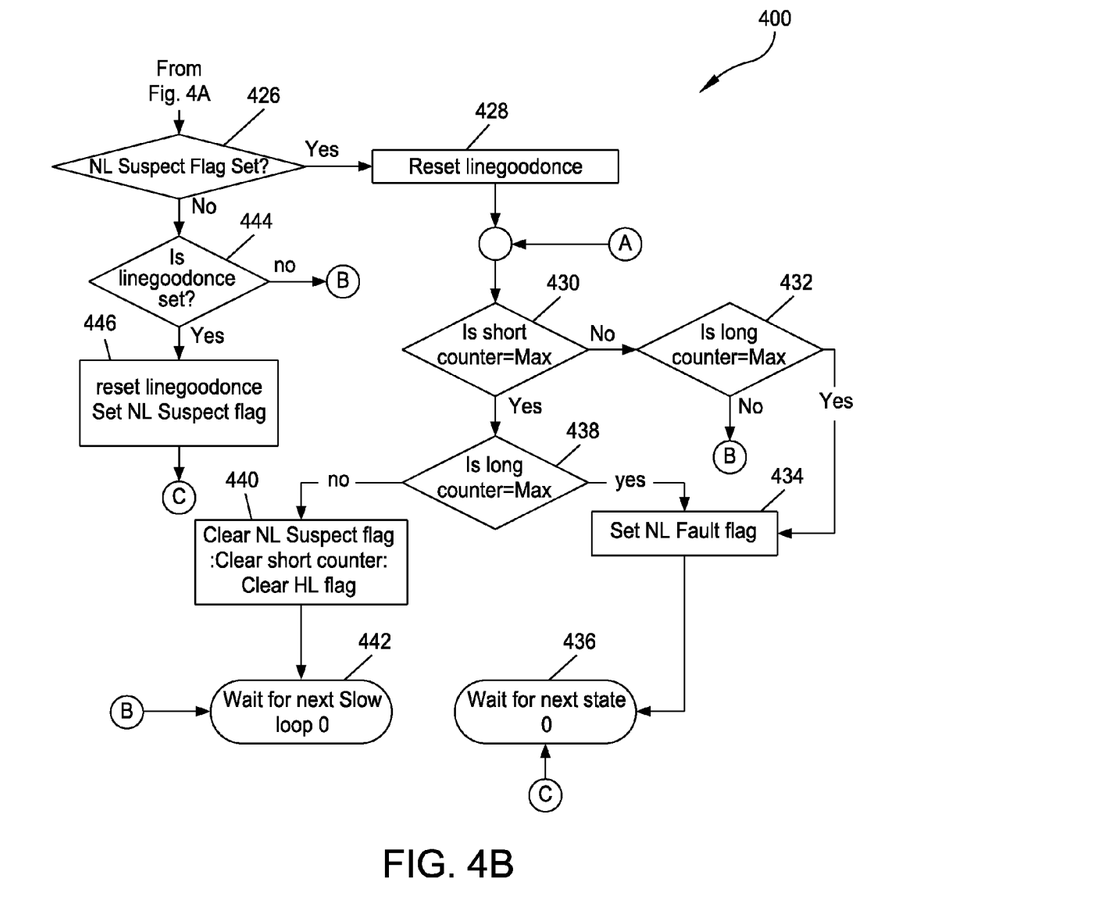
Figure 5:
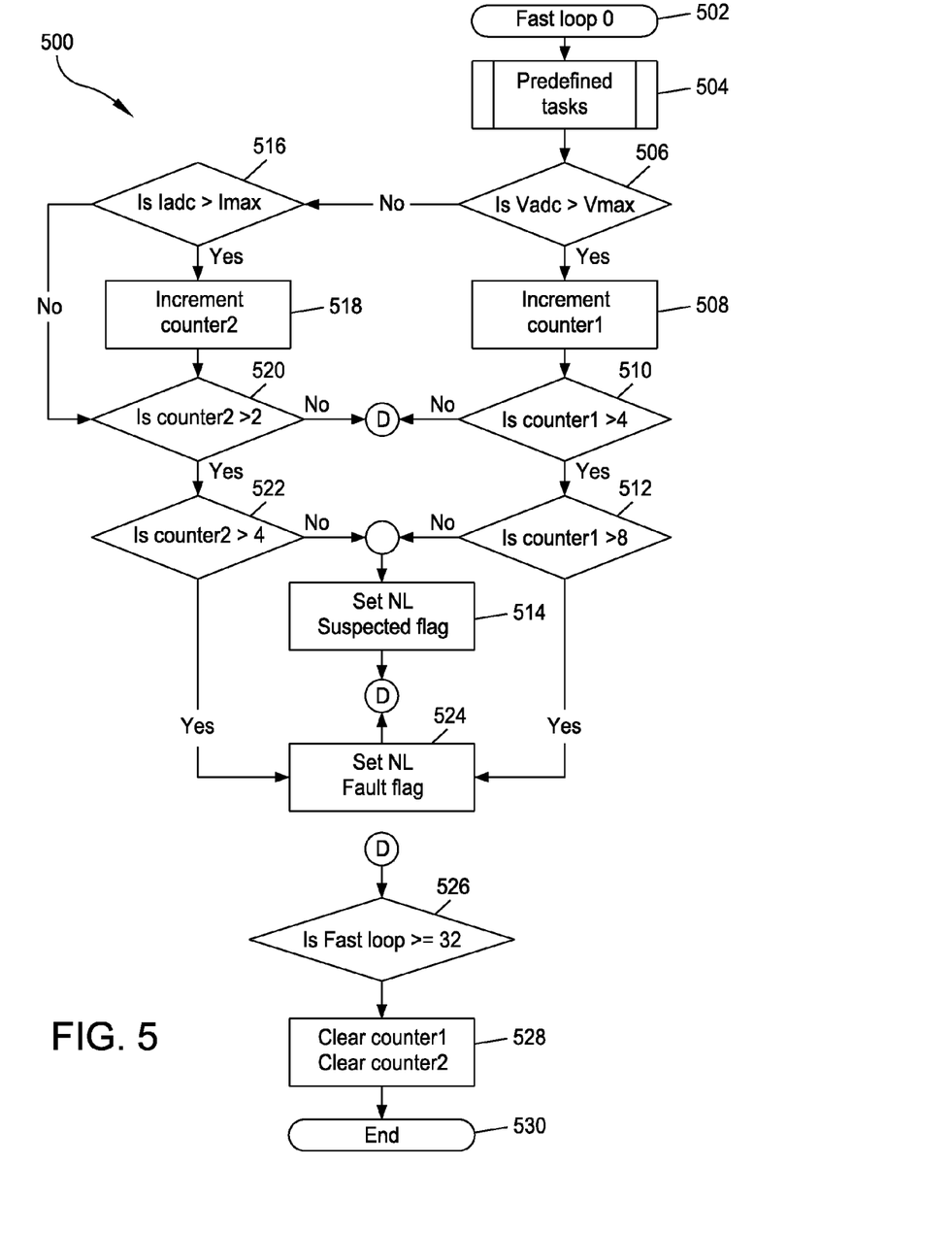
FIG. 5 is a flow chart illustrating one example of an algorithm for a fast loop method of operation of the inverter of FIG. 2, according to one aspects of the invention.

FIGS. 4A-6 are more detailed flow charts of examples of methods of identifying suspected neutral lifting and confirming neutral lifting. FIGS. 4A-5 illustrate examples of algorithms for a slow loop of operation 400 and a fast loop of operation 500, respectively. In one embodiment, the slow loop and the fast loop are run concurrently. FIGS. 4A and 4B are considered a slow loop 400 because it takes more time to operate in relation to the fast loop 500. FIG. 5 is considered a fast loop 500 because it takes less time to operate in relation to the slow loop 400. Those skilled in the art will appreciate that the run times for the fast and slow loops may be dependent on conditions of the system in which they are used and may be variable. For example, in one embodiment in which the inverter 200 is used in an offline UPS, during the fast loop 500, a sample of voltage or current is taken every 600 microseconds. In another embodiment in which the inverter 200 is used in an online UPS, during the fast loop 500, a sample of voltage or current is taken more often than in it is in an offline UPS. For example, a sample of voltage or current may be taken every few microseconds. In other embodiments, the number of samples taken over a line cycle may be defined to any value. In one example, the slow loop 400 may take longer than the fast loop as a result of it requiring a plurality of samples to be taken to generate an average voltage (or current) level on which to operate.

An example of the slow loop 400 in relation to the inverter 200 will now be described with reference to FIGS. 2, 4A, and 4B. At step 402 the slow loop is started. At step 404, any predefined tasks required to start measuring an average voltage on the power line 202 are performed. At step 406, a determination is made whether a High Line (HL) flag is set. The HL flag may be set responsive to a high input voltage being detected (step 304), as discussed above with reference to FIG. 3. Thus, the HL flag being set indicates that a high input voltage has been detected. In response to the HL flag being set (step 406), at step 408 the short retriggerable timer is started. In a next step 410, a determination is made whether the Neutral Lifting suspected (NL Suspect) flag is set. As discussed above, the NL Suspect flag is set when neutral lifting is suspected. If the NL Suspect flag is set (step 410), at step 412 the long non re-triggerable timer is started. In a next step 414 a determination is made whether the average voltage on the power line 202 is above a high voltage threshold. If the voltage is not high, at step 416 a determination is made whether the HL flag is set and, if the HL flag is set, at step 418 a "linegoodonce" flag is set. The "linegoodonce" flag is set when a "good line" 112 or "low line" 114 voltage level occurs after an occurrence of a "high line" 116, i.e., a sag after a swell, which can be a characteristic of a neutral lifting condition at the input voltage 220. Once this condition is identified ("linegoodonce" flag is set), the Neutral Lifting suspected flag can be set on the next occurrence of "high line" 116. The "linegoodonce" flag may be used to distinguish between a normal high line and a neutral lifting condition. If the result of step 414 is that the voltage is high, the system checks whether the "linegoodonce" flag is set (step 420). If the "linegoodonce" flag is set, the short retriggerable timer is reset (step 422). The HL flag is then set (step 424) and a determination is made whether or not the neutral lifting suspected (NL Suspect) flag is set (step 426).

If at step 426 the neutral lifting suspected flag is not set, the system checks whether the "linegoodonce" flag is set (step 444). If not, the system waits for the next cycle of the slow loop 400 (step 442). If in step 444 the "linegoodonce" flag is set, this flag is reset and the NL Suspect flag is set to indicate that neutral lifting is suspected. The system then waits for the next state (step 436). If at step 426 the neutral lifting suspected flag is set, meaning that neutral lifting is already suspected, the "linegoodonce" flag is reset (step 428) The system then checks to see whether the short retriggerable timer has reached its maximum value, i.e., has "timed out" (step 430). Next, at steps 432 and 438 a determination is made whether the long non re-triggerable timer has timed out. In response to a determination in step 432 that the long non re-triggerable timer has timed out, at step 434 the Neutral Lifting Fault state (NL Fault) flag is set. If, on the other hand, the long non re-triggerable timer has not timed out, the NL Suspect and HL flags are cleared, and the short retriggerable timer is reset (step 440), if necessary, and the system waits for the next cycle of the slow loop 400 (step 442). Thus, the slow loop algorithm includes monitoring conditions of the input voltage (i.e., whether it is high, low or good, and the transitions it makes) during time intervals defined by the short retriggerable timer and the long non-retriggerable timer, and based on the conditions of the input voltage, determining whether there is a suspected or actual neutral lifting condition. Appropriate actions may be taken based on suspected and confirmed neutral lifting conditions.

As discussed above, when neutral lifting is suspected and/or confirmed, and the NL Suspect or NL Fault flags are therefore set, state changes in the inverter may be suspended. In one embodiment, the inverter 200 may be programmed to only suspend certain defined state changes when neutral lifting is suspected or confirmed and to allow other certain defined state changes even though neutral lifting is suspected or confirmed. In another embodiment, when neutral lifting is suspected or confirmed, all state changes are suspended. At step 436, after the NL Fault state flag is set in step 434, the inverter 200 may wait to transition to another available state.

An example of the fast loop 500 in relation to the inverter 200 will now be described with reference to FIGS. 2 and 5. At step 502, the fast loop is started. At step 504, any predefined tasks related to taking samples of voltage or current on the power line 202 are performed. Next, at step 506 a determination is made whether a sample of the voltage on the power line 202 is greater than a sample voltage threshold level. In response to a determination in step 506 that a sample of the voltage on the power line 202 is greater than a sample voltage threshold level 506, at step 508 a first counter is incremented. The system then determines whether the value of the first counter is greater than a first defined number (step 510). In the illustrated example, a determination is made whether the value of the first counter is greater than four; however those skilled in the art will appreciate that the first defined number may be any number, not limited to four. In response to a determination in step 510 that the value of the first counter is greater than the first defined number, at step 512 a determination is made whether the value of the first counter is greater than a second defined number. In the illustrated example, the second defined number is eight; however, those skilled in the art will appreciated that the second defined number may be any number not limited to eight. In response to a determination in step 512 that the value of the first counter is greater than the second defined number, at step 524, the NL Fault flag is set (step 524). On the other hand, if the value of the first counter is not greater than the second defined number, then the neutral lifting suspected (NL Suspect) flag is set (step 514).

Still referring to FIG. 5, in response to a determination in step 506 that a sample of the voltage on the power line 202 is less than a sample voltage threshold level, at step 516 a determination is made whether a current on the power line 202 is greater than a sample current threshold level. In response to a current on the power line 202 being greater than a sample current threshold level, at step 518 a second counter is incremented. After the second counter is incremented in step 518, or after a determination in step 516 that a current on the power line 202 is less than a sample current threshold level, at step 520 a determination is made whether the value of the second counter is greater than a third defined number. In the illustrated example, a determination is made whether the value of the second counter is greater than two; however those skilled in the art will appreciate that the third defined number may be any number not limited to two. In response to a determination in step 520 that the value of the second counter is greater than the third defined number, at step 522 a determination is made whether the value of the second counter is greater than a fourth defined number. In the illustrated example, a determination is made whether the value of the second counter is greater than four; however those skilled in the art will appreciate that the fourth defined number may be any number, not limited to four. In response to a determination in step 522 that the value of the second counter is greater than the fourth defined number, at step 524, the NL Fault flag is set. Alternatively, in response to a determination in step 522 that the value of the second counter is not greater than the fourth defined value, at step 514 the NL Suspected flag is set.

Thus, in one example of the fast loop algorithm, samples of the current and voltage on the power line 202 are monitored during defined time intervals set by the first and second counters. Based on the conditions of the sampled voltage and/or current during these time intervals, neutral lifting may be suspected and/or confirmed. When neutral lifting is suspected and/or confirmed, action may be taken to isolate the inverter from the power line, and to suspend state changes in the inverter to protect the inverter from damage during the neutral lifting condition.

In response to a determination in step 510 that the value of the first counter is not greater than a first defined value (e.g., four), or after the NL Suspect or NL Fault flags are set (steps 514 or 524), at step 526, a determination is made whether the defined number of samples has been taken over the current line cycle. In response to a determination in step 526 that the required number of samples has been taken over the current line cycle, the first counter and the second counter are cleared (step 528). Then, at step 530, the fast loop is ended. As discussed above, according to one embodiment, once a neutral lifting fault state is entered, the fault state is exited upon outside interference from a user. In another embodiment, the fault state may be exited responsive to certain conditions being met.

Figure 6:
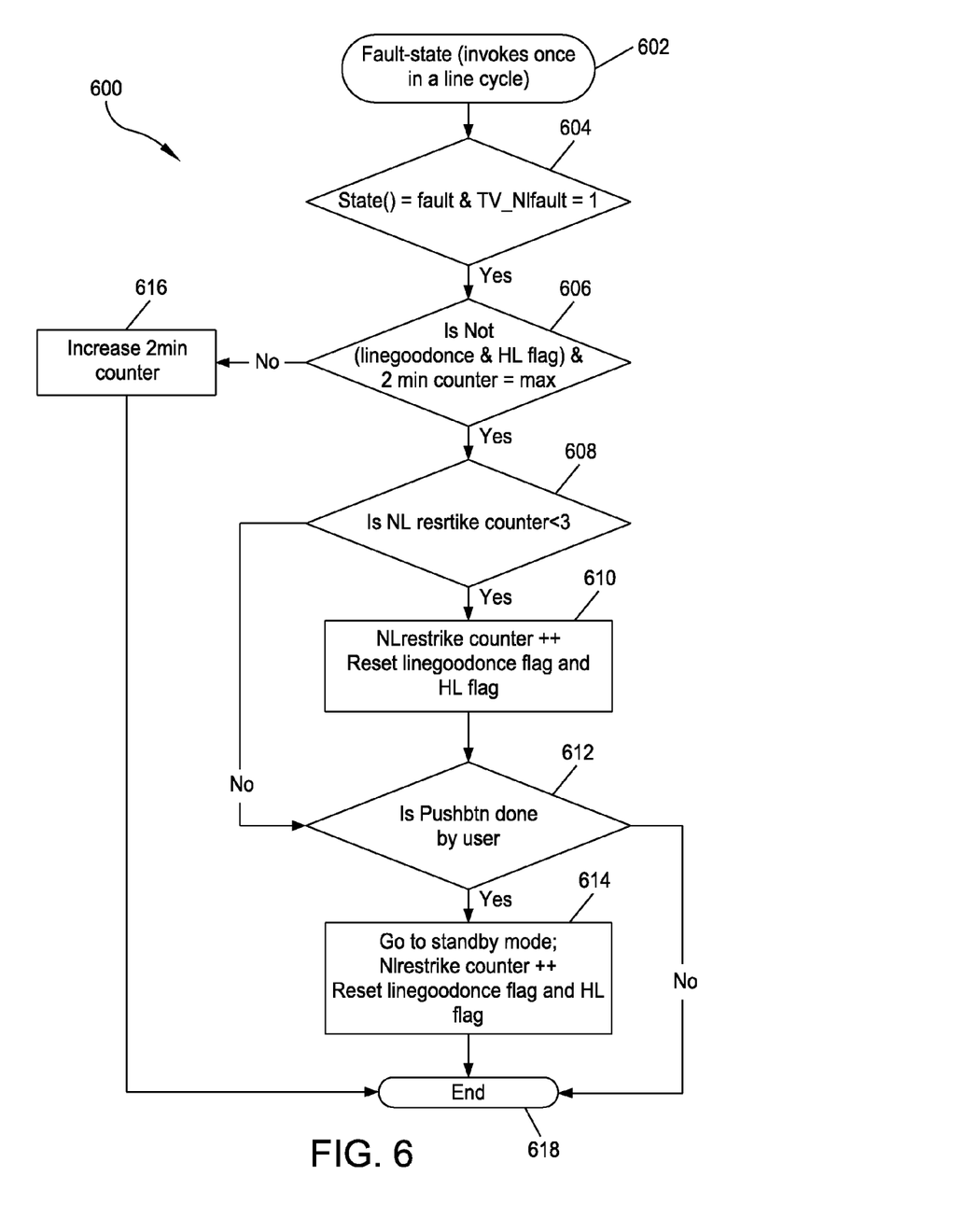
FIG. 6 is a flow chart illustrating one example of an algorithm for self recovery from fault mode of FIG. 2, according to aspects of the invention.

FIG. 6 illustrates an example of an algorithm 600 for self recovery from fault mode in accordance with one embodiment. At step 602, the fault state loop is started. The fault state loop is invoked at least once every line cycle to check for faults. At step 604 a determination is made whether the NL fault flag is set and whether the current state of the inverter should be suspended during an NL fault state. In response to a determination that the NL Fault flag is set and that the current state the inverter should be suspended during a neutral lifting fault state, at step 606 a determination is made whether the "linegoodonce" flag and the HL flag are set and whether a fault counter has timed out. In one embodiment, the fault counter is a 2 minute counter; however those skilled in the art will appreciate that the value of the counter is not limited to two minutes. In response to a determination that the "linegoodonce" flag and the HL flag are set or that the fault counter has not timed out 606, at step 616 the fault counter is started. At step 618, the fault loop is ended.

In response to a determination in step 606 that the "linegoodonce" flag and the HL flag are not set and the fault counter has timed out, at step 608 a determination is made whether a Neutral Lifting (NL) restrike counter is less than a defined value. The NL restrike counter specifies the number of times the system has tried to recover automatically from a fault state without user interference. In the illustrated example, a determination is made whether the NL restrike counter is less than three; however those skilled in the art will appreciate that the value of the counter may be any number and is not limited to three. In response to a determination in step 608 that the NL restrike counter is less than the defined number, at step 610 the NL restrike counter is incremented and the "linegoodonce" flag and the HL flag are reset. At step 612 a determination is made whether there has been outside interference from a user. In one example a user may press a pushbutton. In response to a determination at step 612 that there has been outside interference from a user, at step 614 a standby mode is entered and the "linegoodonce" flag and the HL flag are reset. At step 618, the fault loop is ended.

Still referring to FIG. 6, in response to a determination in step 608 that the NL restrike counter is above a defined value, a determination is made in step 612 whether there has been outside interference from a user. In response to a determination at step 612 that there has been outside interference from a user, at step 614 a standby mode is entered and the "linegoodonce" flag and the HL flag are reset. At step 618, the fault loop is ended.

It should be appreciated that the method of operating an inverter discussed above may be used with any type of inverter with any type of configuration that may be subject to neutral lifting. It should also be appreciated that the method of operating an inverter discussed herein may be used with an inverter in an offline UPS, an online UPS, a line interactive UPS, or any other type of power system.

Aspects and examples of methods and apparatus which may reduce the high current and state hovering problems related to neutral lifting have been described. As discussed above, by isolating the inverter from the input line when a high line is detected high current damage may be prevented, and by suspending state changes when neutral lifting is suspected to prevent state hovering. The methods may also be cost efficient in that they may be implemented with hardware already utilized in an inverter and associated power system.

Having thus described several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of controlling an inverter in an uninterruptable power supply system, the inverter being selectively coupled to a power line and comprising an input to receive an input voltage from the power line, the method comprising acts of:
   monitoring the input voltage;
   detecting based on the act of monitoring, that the input voltage exceeds a predetermined high threshold value;
   isolating the inverter from the power line responsive to detecting that the input voltage exceeds a predetermined high threshold value;
   determining whether or not a neutral lifting condition exists on the power line;
   indicating that the inverter is in a fault state if the neutral lifting condition exists; and
   reconnecting the inverter to the power line if the neutral lifting condition does not exist,
   wherein the act of determining whether the neutral lifting condition exists includes:
      determining, based on the act of monitoring the voltage, that the neutral lifting condition is suspected on the power line; and
      suspending state changes in the inverter responsive to the neutral lifting condition being suspected.

2. The method of claim 1, wherein the act of determining that the neutral lifting condition is suspected includes:
   determining that the input voltage meets a first predetermined condition within a first time period after the input voltage exceeds the predetermined high threshold value; and indicating that the inverter is in a neutral lifting suspected state responsive to the input voltage meeting the first predetermined condition within the first time period.

3. The method of claim 2, wherein determining that the input voltage meets the first predetermined condition includes:
detecting that the input voltage has, within the first time period, transitioned from a value greater than the high voltage threshold value to a value less than the high voltage threshold value and has returned to a value greater than the high voltage threshold value.

4. The method of claim 2, further comprising:
starting a first timer responsive to detecting that the input voltage exceeds the predetermined high threshold value, to define the first predetermined time period.

5. The method of claim 4, wherein starting the first timer includes starting a retriggerable timer; and further comprising resetting the retriggerable timer responsive to at least one of:
the input voltage having transitioned from a value greater than the high voltage threshold value to a value less than the high voltage threshold value;
the input voltage having transitioned from a value less than the high voltage threshold value to a value greater than the high voltage threshold value;
the input voltage having transitioned from a value greater than a low voltage threshold value to a value less than the low voltage threshold value; and
the input voltage having transitioned from a value less than the low voltage threshold value to a value greater than the low voltage threshold value.

6. The method of claim 4, wherein starting the first timer includes starting a 20 second timer to define the first time period to be 20 seconds from when the input voltage exceeds the predetermined high threshold value.

7. The method of claim 2, wherein the act of indicating that the inverter is in a neutral lifting suspected state includes setting a neutral lifting suspected flag.

8. The method of claim 1, wherein the act of determining whether the neutral lifting condition exists further includes:
determining that the inverter meets a second predetermined condition within a second time period after the act of indicating that the neutral lifting condition is suspected; and
indicating that the neutral lifting condition is confirmed responsive to the inverter meeting the second predetermined condition within the second time period.

9. The method of claim 7, wherein the act of indicating that the neutral lifting condition is confirmed includes setting a neutral lifting fault flag.

10. The method of claim 8, wherein determining that the inverter meets the second predetermined condition includes:
detecting that the inverter has remained in the neutral lifting suspected state for the duration of the second time period.

11. The method of claim 10, further comprising:
starting a second time timer responsive to indicating that the inverter is in a neutral lifting suspected state, to define the second time period.

12. The method of claim 11, wherein starting the second timer includes starting a 30 second non-retriggerable timer to define the second time period as 30 seconds from when the neutral lifting condition is suspected.

13. A method of controlling an inverter in an uninterruptable power supply system, the inverter being selectively coupled to a power line and comprising an input to receive an input voltage from the power line, the method comprising acts of:
monitoring the input voltage;
detecting, based on the act of monitoring, that the input voltage exceeds a predetermined high threshold value;
isolating the inverter from the power line responsive to detecting that the input voltage exceeds a predetermined high threshold value;
indicating that a neutral lifting condition is suspected on the power line responsive to the input voltage meeting a first predetermined condition within a first time period after the input voltage exceeds the predetermined high threshold value;
suspending state changes in the inverter responsive to the neutral lifting condition being suspected;
indicating that the neutral lifting condition is confirmed responsive to the input voltage meeting a second predetermined condition within a second time period after the neutral lifting condition is suspected; and
setting the inverter to a fault state responsive to the neutral lifting condition being confirmed.

14. An uninterruptible power supply system comprising:
an input to receive an input voltage;
a power line coupled to the input to receive the input voltage;
an inverter configured to be selectively coupled to the power line and having an inverter input to receive the input voltage from the power line;
a sensor coupled to the inverter input and configured to monitor the input voltage and to generate an indicator representative of a magnitude of the input voltage; and
a controller coupled to the sensor and configured to receive the indicator and to:
determine, based on receiving the indicator, that the input voltage exceeds a predetermined high threshold value;
isolate the inverter from the power line responsive to the input voltage exceeding the predetermined high threshold value;
determine whether or not a neutral lifting condition exists on the power line;
indicate that the inverter is in a fault state if the neutral lifting condition exists; and
reconnect the inverter to the power line if the neutral lifting condition does not exist,
wherein in determining whether or not a neutral lifting condition exists on the power line, the controller is further configured to:
determine, based on receiving the indicator, that the neutral lifting condition is suspected on the power line; and
suspend state changes in the inverter responsive to the neutral lifting condition being suspected.

15. The uninterruptible power supply of claim 14, wherein in determining that the neutral lifting condition is suspected, the controller is further configured to:
determine that the input voltage meets a first predetermined condition within a first time period after the input voltage exceeds the predetermined high threshold value; and
indicate that the inverter is in a neutral lifting suspected state responsive to the input voltage meeting the first predetermined condition within the first time period.

16. The uninterruptible power supply of claim 15, wherein in determining that the input voltage meets the first predetermined condition, the controller is further configured to:
determine that the input voltage has, within the first time period, transitioned from a value greater than the high voltage threshold value to a value less than the high voltage threshold value and has returned to a value greater than the high voltage threshold value.

17. The uninterruptible power supply of claim 15, wherein the controller is further configured to:
   start a first timer responsive to detecting that the input voltage exceeds the predetermined high threshold value, to define the first predetermined time period.

18. The uninterruptible power supply of claim 17, wherein the first timer is a retriggerable timer; and wherein the controller is further configured to reset the retriggerable timer responsive to at least one of:
   the input voltage having transitioned from a value greater than the high voltage threshold value to a value less than the high voltage threshold value;
   the input voltage having transitioned from a value less than the high voltage threshold value to a value greater than the high voltage threshold value;
   the input voltage having transitioned from a value greater than a low voltage threshold value to a value less than the low voltage threshold value; and
   the input voltage having transitioned from a value less than the low voltage threshold value to a value greater than the low voltage threshold value.

19. The uninterruptible power supply of claim 17, wherein the first timer is a 20 second timer that defines the first time period to be 20 seconds from when the input voltage exceeds the predetermined high threshold value.

20. The uninterruptible power supply of claim 15, wherein the controller is further configured to set a neutral lifting suspected flag to indicate that neutral lifting is suspected.

21. The uninterruptible power supply of claim 14, wherein in determining whether the neutral lifting condition exists, the controller is further configured to:
   determine that the inverter meets a second predetermined condition within a second time period after the neutral lifting condition is suspected; and
   indicate that the neutral lifting condition is confirmed responsive to the inverter meeting the second predetermined condition within the second time period.

22. The uninterruptible power supply of claim 20, wherein the controller is further configured to set a neutral lifting fault flag to indicate that the neutral lifting condition is confirmed.

23. The uninterruptible power supply of claim 21, wherein the controller is further configured to:
   start a second time timer responsive to indicating that the inverter is in a neutral lifting suspected state, to define the second time period.

24. The uninterruptible power supply of claim 23, wherein the second timer is a thirty second non-retriggerable timer that defines the duration of the second time period to be thirty seconds.

25. An uninterruptible power supply system comprising:
   an input to receive an input voltage;
   a power line coupled to the input to receive the input voltage;
   an inverter configured to be selectively coupled to the power line and having an inverter input to receive the input voltage from the power line;
   a sensor coupled to the inverter input and configured to monitor the input voltage and to generate an indicator representative of a magnitude of the input voltage; and
   means for determining that the power line is experiencing a neutral lifting condition,
   wherein the means for determining that the power line is experiencing a neutral lifting condition includes means for determining that the neutral lifting condition is suspected on the power line and means for suspending state changes in the inverter responsive to the neutral lifting conditions being suspected.

26. The uninterruptible power supply system of claim 25, wherein the means for determining that the power line is experiencing a neutral lifting condition further includes means for confirming that the neutral lifting condition exists on the power line.

* * * * *